(12) United States Patent
Terashita (10) Patent No.: US 10,665,392 B2
(45) Date of Patent: May 26, 2020

(54) MULTILAYER CERAMIC CAPACITOR

(71) Applicant: Murata Manufacturing Co., Ltd., Nagaokakyo-shi, Kyoto-fu (JP)

(72) Inventor: Yosuke Terashita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/177,537

(22) Filed: Nov. 1, 2018

(65) Prior Publication Data
US 2019/0148074 A1    May 16, 2019

(30) Foreign Application Priority Data
Nov. 15, 2017 (JP) ................. 2017-219686

(51) Int. Cl.
| H01G 4/232 | (2006.01) |
| H01G 4/30 | (2006.01) |
| H01G 4/12 | (2006.01) |

(52) U.S. Cl.
CPC ............. *H01G 4/2325* (2013.01); *H01G 4/12* (2013.01); *H01G 4/30* (2013.01); *H01G 4/1227* (2013.01)

(58) Field of Classification Search
CPC ........... H01G 4/30; H01G 4/228; H01G 4/232
See application file for complete search history.

(56) References Cited

U.S. PATENT DOCUMENTS

| 2006/0044098 | A1 | 3/2006 | Kimura et al. | |
| 2014/0293500 | A1* | 10/2014 | Seo | H01G 4/12 361/301.4 |
| 2015/0090483 | A1* | 4/2015 | Moon | H01G 4/30 174/260 |
| 2015/0170786 | A1* | 6/2015 | Hong | H01G 4/232 174/260 |
| 2015/0187500 | A1* | 7/2015 | Kang | H01G 4/30 174/260 |
| 2016/0141103 | A1 | 5/2016 | Hamanaka et al. | |
| 2017/0301468 | A1* | 10/2017 | Kim | H01G 4/232 |

FOREIGN PATENT DOCUMENTS

| JP | 11-162771 A | 6/1999 | |
| JP | 2006086063 A | * 3/2006 | ......... H05B 33/0845 |
| JP | 2013-069713 A | 4/2013 | |
| JP | 2015-035631 A | 2/2015 | |
| WO | WO-9410697 A1 | * 5/1994 | ........... H01G 4/2325 |
| WO | 2004/053901 A1 | 6/2004 | |

OTHER PUBLICATIONS

Official Communication issued in corresponding Korean Patent Application No. 10-2018-0139029, dated Nov. 19, 2019.

* cited by examiner

*Primary Examiner* — Eric W Thomas
(74) *Attorney, Agent, or Firm* — Keating & Bennett, LLP (57) ABSTRACT

A multilayer ceramic capacitor includes a multilayer body including dielectric layers, inner electrodes and outer electrodes that are connected to the inner electrodes and disposed on a first end surface and a second end surface of the multilayer body. The outer electrodes each include a resin electrode layer containing a thermosetting resin and a metal component and a plating layer in contact with the resin electrode layer. The metal component of the resin electrode layer contains Ni. The plating layer is a Sn plating layer.

17 Claims, 5 Drawing Sheets

MULTILAYER CERAMIC CAPACITOR

CROSS REFERENCE TO RELATED APPLICATIONS

This application claims the benefit of priority to Japanese Patent Application No. 2017-219686 filed on Nov. 15, 2017. The entire contents of this application are hereby incorporated herein by reference.

BACKGROUND OF THE INVENTION

1. Field of the Invention

The present invention relates to a multilayer ceramic capacitor and particularly to, for example, a multilayer ceramic capacitor including a multilayer body obtained by alternately laminating dielectric layers and inner electrodes.

2. Description of the Related Art

In recent years, multilayer ceramic capacitors have been used in more and more severe environments than ever before.

Multilayer ceramic capacitors used in mobile devices such as cellular phones and portable music players are required to withstand a drop impact. Specifically, it is necessary to ensure that the multilayer ceramic capacitors neither detach from a mounting substrate nor crack even if such devices are subjected to a drop impact.

Multilayer ceramic capacitors used in in-car devices such as electronic control units (ECUs) are required to withstand an impact resulting from heat cycles. Specifically, it is necessary to ensure that the multilayer ceramic capacitors do not crack even if exposed to a flexural stress generated by thermal expansion and contraction due to heat cycles of a mounting substrate.

In view of this, it has been proposed to use a thermosetting conductive resin paste for outer electrodes of a multilayer ceramic capacitor. For example, Japanese Unexamined Patent Application Publication No. 11-162771 discloses that an epoxy-based thermosetting resin layer is formed between a known electrode layer and a Ni plating layer to cause stress relaxation, thereby preventing formation of cracks in a multilayer body even in a severe environment.

In general, however, the multilayer ceramic capacitor containing such a thermosetting resin tends to adsorb moisture because the thermosetting resin itself has hygroscopicity. Furthermore, such a resin is decomposed when exposed to a high temperature of about 250° C. in lead-free soldering (LF soldering). Therefore, moisture adsorbed to a resin in the resin electrode layer and resin-decomposed components are vaporized by heating performed when a multilayer ceramic capacitor is mounted on a substrate by reflow soldering. At this time, the generated gas is sometimes locally ejected so as to break through the weakest points of a Ni plating film that is generally provided to ensure the sealing properties (for preventing permeation of moisture or the like and erosion of solder) of the outer electrodes. As a result, molten solder and a molten Sn plating layer are blown away, which causes a defect called solder bursting.

This defect tends to be considerably caused not only in a structure disclosed in Japanese Unexamined Patent Application Publication No. 11-162771 but also a structure in which a resin electrode layer is directly formed on a multilayer ceramic capacitor as disclosed in International Publication No. 2004/053901. The reason for this is as follows.

Since resins have poor sealing properties against water vapor, moisture held in the multilayer ceramic capacitor also sometimes enters the resin electrode layer. Thus, the amount of moisture vaporized is increased in a resin outer electrode, which further causes solder bursting.

SUMMARY OF THE INVENTION

Accordingly, preferred embodiments of the present invention provide multilayer ceramic capacitors which contain the thermosetting resin used in Japanese Unexamined Patent Application Publication No. 11-162771 or International Publication No. 2004/053901 and in which solder bursting does not readily occur even under severe conditions.

According to a preferred embodiment of the present invention, a multilayer ceramic capacitor includes a multilayer body that includes a plurality of dielectric layers laminated and a plurality of inner electrodes laminated and that includes a first main surface and a second main surface that are opposite each other in a lamination direction, a first side surface and a second side surface that are opposite each other in a width direction perpendicular or substantially perpendicular to the lamination direction, and a first end surface and a second end surface that are opposite each other in a length direction perpendicular or substantially perpendicular to the lamination direction and the width direction, and outer electrodes that are connected to the inner electrodes and disposed on the end surfaces. The outer electrodes each include a resin electrode layer including a thermosetting resin and a metal component and a plating layer disposed so as to be in contact with the resin electrode layer, the metal component contains Ni, and the plating layer is a Sn plating layer.

A surface of each of the outer electrodes preferably includes a portion in which a resin component of the resin electrode layer is exposed.

Furthermore, $Lf/La \leq 0.98$ is preferably satisfied, where La represents a length of an interface between the resin electrode layer and the plating layer and Lf represents a length of a portion in which the plating layer and the metal component in the resin electrode layer are in contact with each other at the interface between the resin electrode layer and the plating layer.

Furthermore, $0.92 \leq Lf/La$ is preferably satisfied, where La represents a length of an interface between the resin electrode layer and the plating layer and Lf represents a length of a portion in which the plating layer and the metal component in the resin electrode layer are in contact with each other at the interface between the resin electrode layer and the plating layer.

Preferably, the outer electrodes each further include an underlying electrode layer containing a conductive metal and a glass component, the underlying electrode layer is disposed so as to cover an end surface of the multilayer body, and the resin electrode layer is disposed on the underlying electrode layer.

Furthermore, Ni defining the metal component is preferably elemental Ni or an alloy containing Ni.

In a multilayer ceramic capacitor according to preferred embodiment of the present invention, by directly disposing the Sn plating layer on the surface of the resin electrode layer mainly containing Ni, the Sn plating layer is melted together with solder during mounting. This induces formation of portions in which the resin component of the resin electrode layer is exposed without providing the Sn plating layer on the resin component of the resin electrode layer. Thus, by providing portions that are not covered with the Sn plating layer on the surface of the outer electrode, paths through which water vapor and organic gas generated from the resin electrode layer during reflow flow to the surface are able to be provided. When Lf/La satisfies Lf/La≤0.98, where La represents the length of an interface between the resin electrode layer and the plating layer and Lf represents the length of a portion in which the plating layer and a metal in the resin electrode layer are in contact with each other at the interface between the resin electrode layer and the plating layer, water vapor and organic gas generated from the resin electrode layer during reflow is able to be caused to flow to the surface. When a Ni plating layer that is a known structure is formed, the paths are only dot-shaped paths formed by locally destroying the Ni plating layer in a portion between the Ni plating layer and the resin electrode layer (since the Ni plating layer covers the entire surface of the resin electrode layer, there are basically no escape routes, but the electrode surface is locally destroyed by water vapor and organic gas generated from the resin electrode layer). In various preferred embodiments of the present invention, however, by disposing the Sn plating layer on the resin electrode layer, the Sn plating layer is melted together with solder during mounting, which induces formation of regions in which the Sn plating layer is not present on the resin component of the resin electrode layer. Thus, by forming portions not covered with the Sn plating layer on the surface of the outer electrode, paths through which water vapor and organic gas generated from the resin electrode layer during reflow flow to the surface are able to be provided as linear paths that thread through portions between particles of the metal component of the resin electrode layer (the lines that trace portions which appear on the resin component on the electrode surface and in which the Sn plating layer is not present). This ensures paths through which gas is ejected to the surface of the outer electrode. Consequently, the pressure of water vapor and organic gas generated from the resin electrode layer during reflow does not increase compared with the known Ni plating structure in which paths through which gas is ejected to the surface of the outer electrode are localized, and thus solder bursting is able to be reduced or prevented with certainty.

On the other hand, when 0.92>Lf/La is satisfied, the number of interfaces between the resin on the surface of the resin electrode layer and solder is large. Consequently, a fixing force normally obtained by forming an alloy between the solder and the outer electrode surface (plating layer) is not obtained at the interfaces, which may cause chip detachment after mounting. Therefore, by satisfying 0.92≤Lf/La, a strong fixing force is able to be maintained between the mounting substrate and the multilayer ceramic capacitor.

Furthermore, the cost for forming the Ni plating layer is not required, and thus the cost is able to be reduced compared with the case of the known structure.

When Ni is contained in the metal in the resin electrode layer, formation of gaps (so-called "solder erosion") due to rapid diffusion of the metal component into solder during mounting is able to be prevented. Thus, an effect of reducing or preventing solder erosion, which has been ensured by a Ni plating layer disposed on the resin electrode layer, is achieved without using the Ni plating layer.

Accordingly, preferred embodiments of the present invention provide multilayer ceramic capacitors in which solder bursting does not readily occur even under severe conditions.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
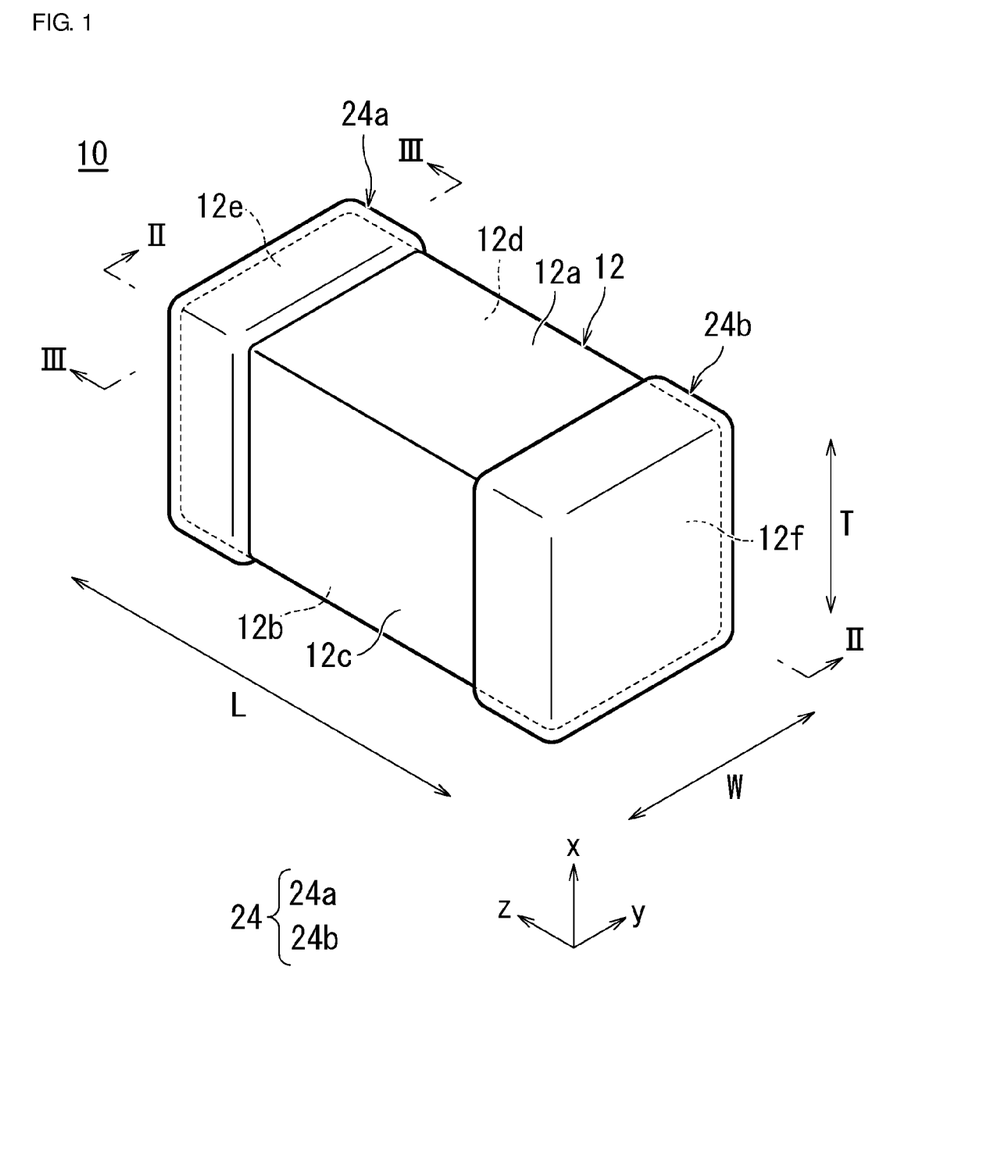
FIG. 1 is an external perspective view illustrating an example of a multilayer ceramic capacitor according to a preferred embodiment of the present invention.
Figure 2:
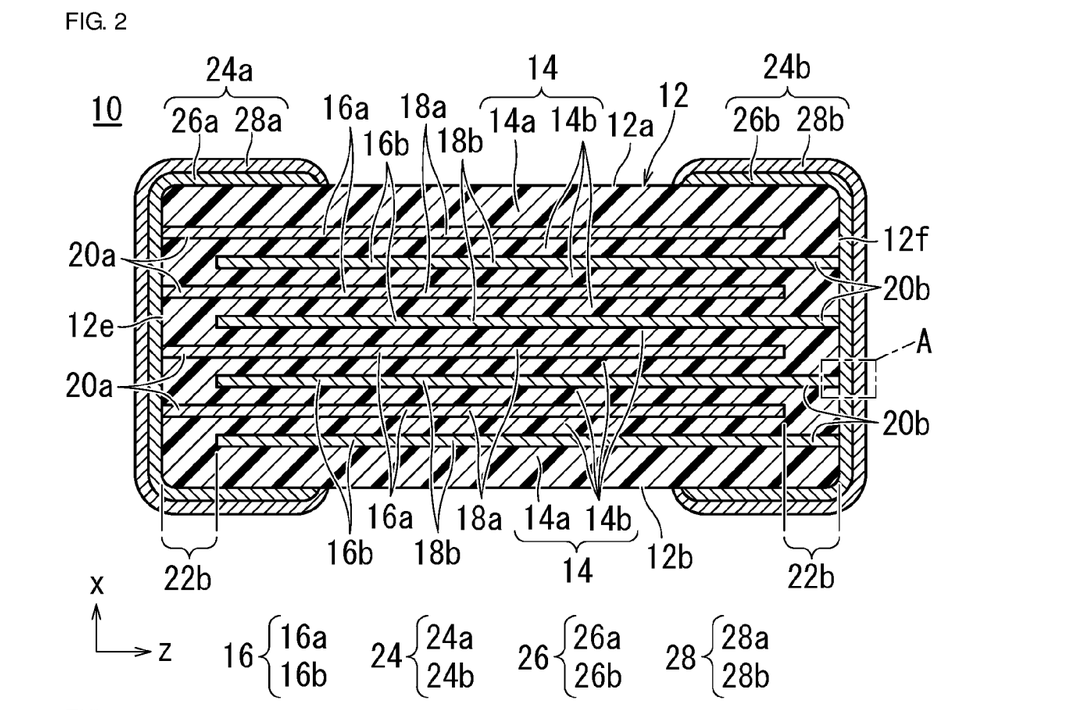
FIG. 2 is a sectional view that is taken along line II-II in FIG. 1 and illustrates a multilayer ceramic capacitor according to a preferred embodiment of the present invention.
Figure 3:
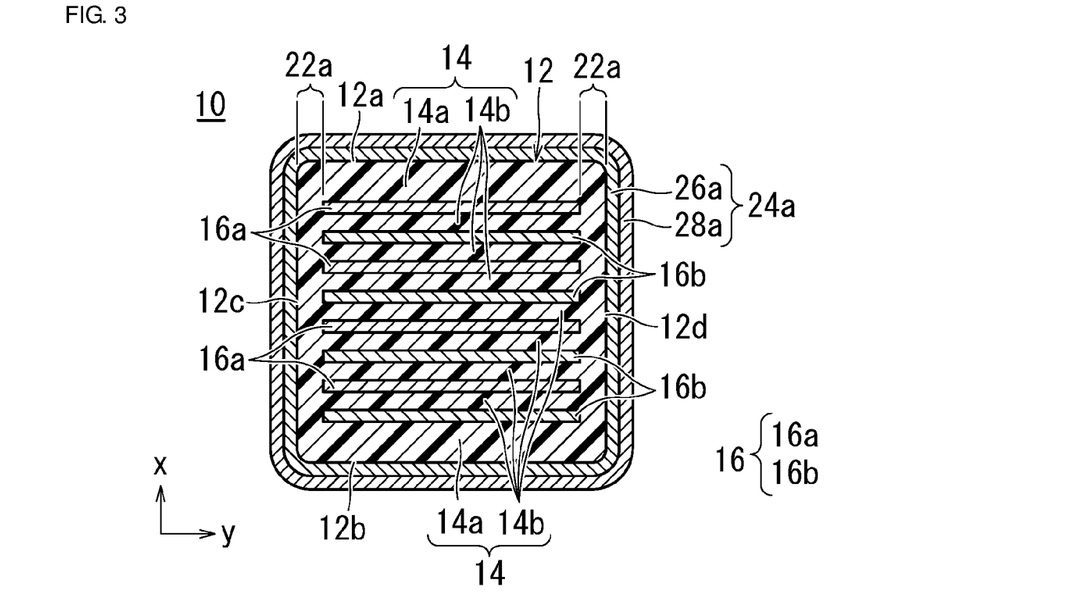
FIG. 3 is a sectional view that is taken along line III-III in FIG. 1 and illustrates a multilayer ceramic capacitor according to a preferred embodiment of the present invention.

Multilayer ceramic capacitors according to preferred embodiments of the present invention will be described. FIG. 1 is an external perspective view illustrating an example of a multilayer ceramic capacitor according to a preferred embodiment of the present invention. FIG. 2 is a sectional view that is taken along line II-II in FIG. 1 and illustrates a multilayer ceramic capacitor according to preferred embodiment of the present invention. FIG. 3 is a sectional view that is taken along line in FIG. 1 and illustrates a multilayer ceramic capacitor according to a preferred embodiment of the present invention.

As illustrated in FIG. 1 to FIG. 3, a multilayer ceramic capacitor 10 includes a rectangular or substantially rectangular parallelepiped multilayer body 12.

The multilayer body 12 includes laminated dielectric layers 14 and inner electrode layers 16. The multilayer body 12 includes a first main surface 12a and a second main surface 12b that are opposite each other in a lamination direction x, a first side surface 12c and a second side surface 12d that are opposite each other in a width direction y perpendicular or substantially perpendicular to the lamination direction x, and a first end surface 12e and a second end surface 12f that are opposite each other in a length direction z perpendicular or substantially perpendicular to the lamination direction x and the width direction y. The multilayer body 12 preferably includes rounded corner portions or rounded ridge portions. The corner portion refers to a portion in which three adjacent surfaces of the multilayer body intersect. The ridge portion refers to a portion in which two adjacent surfaces of the multilayer body intersect. Furthermore, for example, depressions and projections may be provided on a portion or the entirety of the first main surface 12a and the second main surface 12b, the first side surface 12c and the second side surface 12d, and the first end surface 12e and the second end surface 12f.

For the external dimensions of the multilayer body 12, the length L (the length of the multilayer body 12 in the length direction z) is preferably about 0.370 mm or more and about 5.500 mm or less, the width W (the length of the multilayer body 12 in the width direction y) is preferably about 0.195 mm or more and about 4.920 mm or less, and the thickness T (the length of the multilayer body 12 in the lamination direction x) is preferably about 0.195 mm or more and about 2.960 mm or less, for example.

The dielectric layers 14 of the multilayer body 12 include outer layer portions 14a defined by a plurality of dielectric layers and an inner layer portion 14b defined by a plurality of dielectric layers. The outer layer portions 14a are dielectric layers 14 located close to the main surfaces 12a and 12b of the multilayer body 12 and between the main surfaces 12a and 12b and the inner electrode layers 16 closest to the main surfaces 12a and 12b. The region sandwiched between both the outer layer portions 14a is an inner layer portion 14b.

The ceramic material for the dielectric layers 14 of the multilayer body 12 can be a dielectric ceramic material containing, for example, $BaTiO_3$, $CaTiO_3$, $SrTiO_3$, or $CaZrO_3$ as a main component. A sub-component such as a Mn compound, an Fe compound, a Cr compound, a Co compound, or a Ni compound may be added to the main component.

The dielectric layers 14 preferably have a thickness of about 0.5 μm or more and about 20 μm or less, for example. The outer layer portions 14a preferably have a thickness of about 50 μm or more and about 300 μm or less, for example.

The number of the dielectric layers 14 including the outer layer portions 14a is preferably 15 or more and 200 or less, for example.

A plurality of inner electrode layers 16 of the multilayer body 12 include a plurality of first inner electrode layers 16a and a plurality of second inner electrode layers 16b.

The first inner electrode layers 16a each include a first facing electrode portion 18a that faces the second inner electrode layer 16b and a first extended electrode portion 20a extended from the first facing electrode portion 18a to the first end surface 12e of the multilayer body 12. The first extended electrode portion 20a has an end portion extended to the first end surface 12e of the multilayer body 12, thus defining an exposed portion.

The second inner electrode layers 16b each include a second facing electrode portion 18b that faces the first inner electrode layer 16a and a second extended electrode portion 20b extended from the second facing electrode portion 18b to the second end surface 12f of the multilayer body 12. The second extended electrode portion 20b has an end portion extended to the second end surface 12f of the multilayer body 12, thus defining an exposed portion.

The first facing electrode portion 18a of the first inner electrode layer 16a and the second facing electrode portion 18b of the second inner electrode layer 16b may have any shape, but preferably have a rectangular or substantially rectangular shape. The corner portions of the first facing electrode portion 18a and the second facing electrode portion 18b may be rounded or, for example, may be obliquely shaped in a tapered manner.

The first extended electrode portion 20a of the first inner electrode layer 16a and the second extended electrode portion 20b of the second inner electrode layer 16b may have any shape, but preferably have a rectangular or substantially rectangular shape. The corner portions of the first extended electrode portion 20a and the second extended electrode portion 20b may be rounded or, for example, may be obliquely shaped in a tapered manner.

The first facing electrode portion 18a and the first extended electrode portion 20a may be structured to have the same width or so that one of the first facing electrode portion 18a and the first extended electrode portion 20a has a smaller width than the other. The second facing electrode portion 18b and the second extended electrode portion 20b may be structured to have the same width or so that one of the second facing electrode portion 18b and the second extended electrode portion 20b has a smaller width than the other.

Figure 4A:
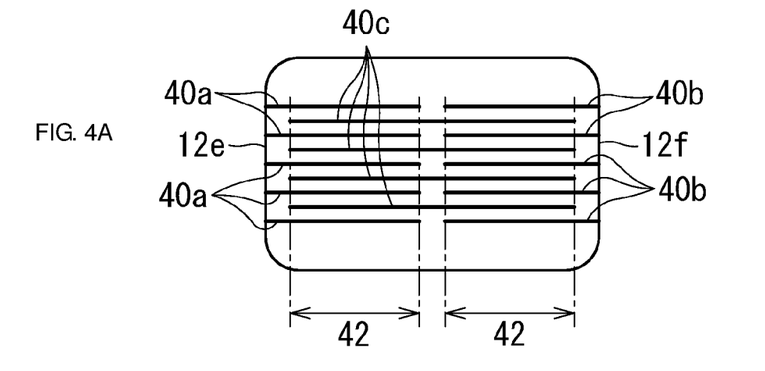
FIG. 4A illustrates a structure in which two facing electrode portions of inner electrodes of a multilayer ceramic capacitor according to a preferred embodiment of the present invention are provided in a divided manner.
Figure 4B:
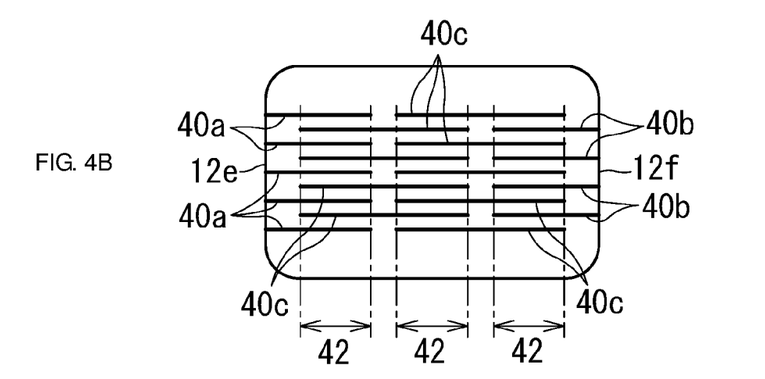
FIG. 4B illustrates a structure in which three facing electrode portions of inner electrodes of a multilayer ceramic capacitor according to a preferred embodiment of the present invention are provided in a divided manner.
Figure 4C:
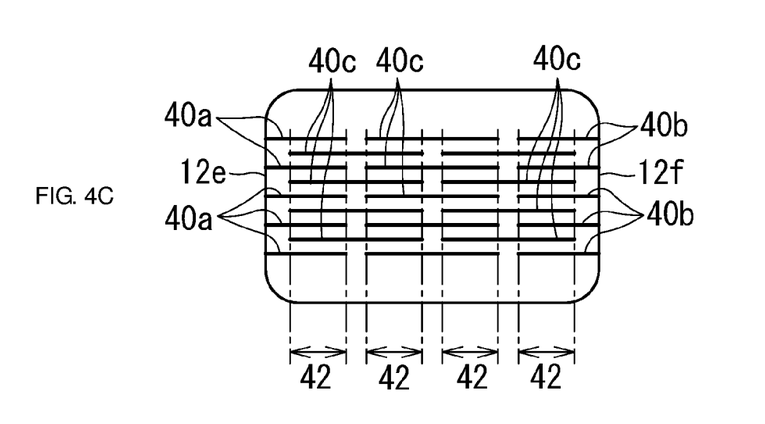
FIG. 4C illustrates a structure in which four facing electrode portions of inner electrodes of a multilayer ceramic capacitor according to a preferred embodiment of the present invention are provided in a divided manner.

As illustrated in FIG. 4, the multilayer body 12 may have a structure in which first inner electrode layers 40a, second inner electrode layers 40b, and floating inner electrode layers 40c that are not extended to either the first end surface 12e or the second end surface 12f are disposed and a plurality of facing electrode portions 42 are defined by the floating inner electrode layers 40c in a divided manner. For example, a two consecutive structure illustrated in FIG. 4A, a three consecutive structure illustrated in FIG. 4B, or a four consecutive structure illustrated in FIG. 4C is provided and a four or more consecutive structure may be obviously provided. By providing such a structure in which a plurality of facing electrode portions 42 are divided, a plurality of capacitor components are defined among the inner electrodes 40a, 40b, and 40c facing each other and these capacitor components are connected in series. Thus, the voltage applied to each of the capacitor components is decreased, which increases the withstand voltage of the multilayer ceramic capacitor.

In the multilayer body 12, the first inner electrode layers 16a and the second inner electrode layers 16b include side portions (hereafter referred to as "W gaps") 22a of the multilayer body 12 located between the facing electrode portions 18a and 18b that face each other and the side surfaces 12c and 12d.

Furthermore, the multilayer body 12 includes end portions (hereafter referred to as "L gaps") 22b that are located between the facing electrode portions 18a and 18b that face each other and the end surfaces 12f and 12e and that include one of the extended electrode portions 20a and 20b of the first and second inner electrode layers 16a and 16b.

The first inner electrode layer 16a and the second inner electrode layer 16b may include a conductive material, e.g., a metal such as Ni, Cu, Ag, Pd, or Au or an alloy containing at least one of the metals, such as an Ag—Pd alloy.

When the first facing electrode portions 18a and the second facing electrode portions 18b of the inner electrode layers 16 are disposed so as to face each other with the dielectric layers interposed therebetween, the electrostatic capacitance is generated and the characteristics of capacitors are exhibited.

The first inner electrode layers 16a and the second inner electrode layers 16b each preferably have a thickness of, for example, about 0.2 μm or more and about 2.0 μm or less, for example. The number of the first inner electrode layers 16a and the second inner electrode layers 16b is preferably 15 or more and 200 or less, for example.

Outer electrodes 24 are disposed on the side of the first end surface 12e and on the side of the second end surface 12f of the multilayer body 12. The outer electrodes 24 are connected to the inner electrodes 16 of the multilayer body 12. The outer electrodes 24 include a first outer electrode 24a and a second outer electrode 24b.

The first outer electrode 24a is disposed on the first end surface 12e of the multilayer body 12 and preferably extends from the first end surface 12e and to partly cover the first main surface 12a, the second main surface 12b, the first side surface 12c, and the second side surface 12d. In this case, the first outer electrode 24a is connected to the first inner electrode layers 16a.

The second outer electrode 24b is disposed on the second end surface 12f of the multilayer body 12 and preferably extends from the second end surface 12f and to partly cover the first main surface 12a, the second main surface 12b, the first side surface 12c, and the second side surface 12d. In this case, the second outer electrode 24b is connected to the second inner electrode layers 16b.

The first outer electrode 24a and the second outer electrode 24b each include a resin electrode layer 26 containing a thermosetting resin 32 and a metal component 34 and a plating layer 28 disposed in contact with the resin electrode layer 26.

The resin electrode layer 26 includes a first resin electrode layer 26a and a second resin electrode layer 26b.

The first resin electrode layer 26a is disposed so as to cover the first end surface 12e of the multilayer body 12 and to be connected to the first inner electrode layers 16a. Specifically, the first resin electrode layer 26a is preferably disposed so as to cover portions of the first main surface 12a and the second main surface 12b and portions of the first side surface 12c and the second side surface 12d. The first resin electrode layer 26a may be disposed only on the first end surface 12e.

The second resin electrode layer 26b is disposed so as to cover the second end surface 12f of the multilayer body 12 and to be connected to the second inner electrode layers 16b. Specifically, the second resin electrode layer 26b is preferably disposed so as to cover portions of the first main surface 12a and the second main surface 12b and portions of the first side surface 12c and the second side surface 12d. The second resin electrode layer 26b may be disposed only on the second end surface 12f.

The thickness of central portions of the first resin electrode layer 26a and the second resin electrode layer 26b on the first main surface 12a, the second main surface 12b, the first side surface 12c, and the second side surface 12d in the length direction of the first resin electrode layer 26a and the second resin electrode layer 26b is preferably, for example, about 10 μm or more and about 120 μm or less, for example.

The thickness of the central portions of the first resin electrode layer 26a and the second resin electrode layer 26b on the first end surface 12e and the second end surface 12f in the height direction of the first resin electrode layer 26a and the second resin electrode layer 26b is preferably, for example, about 5 μm or more and about 40 μm or less, for example.

Figure 5:
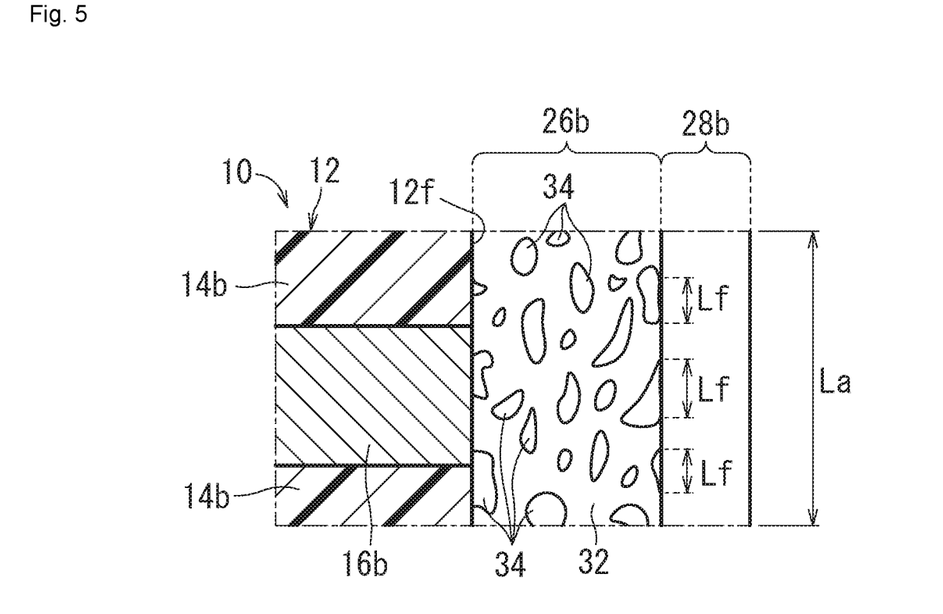
FIG. 5 is an enlarged view of an A portion in FIG. 2, which illustrates the details of the state of an interface between a resin electrode layer and a plating layer of a multilayer ceramic capacitor according to a preferred embodiment of the present invention.

As illustrated in FIG. 5, the first resin electrode layer 26a and the second resin electrode layer 26b each contain a thermosetting resin 32 and a metal component 34.

Since the first resin electrode layer 26a and the second resin electrode layer 26b contain a thermosetting resin 32, they are more flexible than, for example, plating films and underlying electrode layers obtained by firing a conductive paste. Therefore, even if the multilayer ceramic capacitor is subjected to a physical impact or an impact resulting from heat cycles, the resin electrode layer 26 defines and functions as a shock absorbing layer, which prevents formation of cracks in the multilayer ceramic capacitor 10.

Specific examples of the thermosetting resin 32 include publicly known various thermosetting resins such as an epoxy resin, a phenolic resin, a urethane resin, a silicone resin, and a polyimide resin. Among them, an epoxy resin having, for example, high heat resistance, high moisture resistance, and good adhesiveness is one of the most suitable resins.

The first and second resin electrode layers 26a and 26b preferably contain a curing agent in addition to the thermosetting resin 32. When an epoxy resin is used as a base resin, publicly known various compounds such as a phenolic compound, an amine compound, an acid anhydride compound, and an imidazole compound can be used as the curing agent for the epoxy resin.

The metal component 34 contained in the first resin electrode layer 26a and the second resin electrode layer 26b contains Ni. Specifically, the metal component 34 contained in the first resin electrode layer 26a and the second resin electrode layer 26b is elemental Ni or an alloy or compound containing Ni. In the case of the alloy containing Ni, for example, Ag—Ni and Cu—Ni can be used. In the case of the compound containing Ni, for example, $Ni_3Sn$, $Ni_3Sn_2$, and $Ni_3Sn_4$ can be used. When Ni is contained in the metal component 34 in the resin electrode layer 26, formation of gaps due to rapid diffusion of the metal component 34 into solder during mounting is able to be prevented. Thus, an effect of reducing or preventing solder erosion, which has been ensured by a Ni plating layer disposed on the resin electrode layer 26, is able to be produced without using the Ni plating layer. This does not require the cost for forming the Ni plating layer and thus the cost is able to be reduced compared with known structures.

The content of the metal component 34 in the resin electrode layer 26 is preferably about 35 vol % or more and about 92 vol % or less relative to the total volume of the conductive resin, for example.

The metal component 34 contained in the resin electrode layer 26 may have any shape. For example, a spherical shape, a flat shape, and a needle shape may be used. The metal component contained in the resin electrode layer 26 is preferably a mixture of a spherical metal powder and a flat metal powder.

The metal component 34 contained in the resin electrode layer 26 may have any average particle size. For example, the average particle size may be about 0.3 μm or more and about 10 μm or less.

The main function of the metal component 34 contained in the resin electrode layer 26 is to allow the resin electrode layer 26 to have electrical conductivity. Specifically, particles of the metal component 34 contained in the resin electrode layer 26 come into contact with each other, thus defining an electric current path in the resin electrode layer 26.

The plating layer 28 is a Sn plating layer.

The plating layer 28 includes a first plating layer 28a and a second plating layer 28b.

The first plating layer 28a is disposed so as to cover the first resin electrode layer 26a. The second plating layer 28b is disposed so as to cover the second resin electrode layer 26b. Specifically, the first plating layer 28a is disposed on the first resin electrode layer 26a located on the first end surface 12e of the multilayer body 12 and is preferably disposed so as to cover the first resin electrode layer 26a located on the first main surface 12a, the second main surface 12b, the first side surface 12c, and the second side surface 12d. The first plating layer 28a preferably completely covers the first resin electrode layer 26a.

The second plating layer 28b is disposed on the second resin electrode layer 26b located on the second end surface 12f of the multilayer body 12 and is preferably disposed on the second resin electrode layer 26b located on the first main surface 12a, the second main surface 12b, the first side surface 12c, and the second side surface 12d. The second plating layer 28b preferably completely covers the second resin electrode layer 26b.

By directly forming the plating layer 28 on the surface of the resin electrode layer 26, the Sn plating layer is melted together with solder during mounting. This induces formation of portions in which the resin component 32 of the resin electrode layer 26 is exposed without providing the Sn plating layer on the resin component of the resin electrode layer 26. Thus, portions in which the resin component of the resin electrode layer 26 are exposed without being covered with the Sn plating layer are provided on the surface of the outer electrode 24, which provides paths through which water vapor and organic gas generated from the resin electrode layer 26 during reflow flow to the surface. Therefore, the pressure of water vapor and organic gas generated from the resin electrode layer 26 during reflow is able to be released from the inside of the outer electrode 24, which reduces or prevents solder bursting.

The first plating layer 28a and the second plating layer 28b each preferably have a thickness of about 2 μm or more and about 10 μm or less, for example.

For the external dimensions of the multilayer body 12 with the outer electrodes 24, the length L (the length of the multilayer body 12 with the outer electrodes 24 in the length direction z) is preferably about 0.4 mm or more and about 6.1 mm or less, the width W (the length of the multilayer body 12 with the outer electrodes 24 in the width direction y) is preferably about 0.2 mm or more and about 5.4 mm or less, and the thickness T (the length of the multilayer body 12 with the outer electrodes 24 in the lamination direction x) is preferably about 0.2 mm or more and about 3.0 mm or less, for example.

Next, a method for producing a multilayer ceramic capacitor according to a preferred embodiment of the present invention will be described.

(1) First, a dielectric sheet and a conductive paste for inner electrodes are provided.

The dielectric sheet and the conductive paste for inner electrodes contain a binder and a solvent. A publicly known organic binder and organic solvent can be used.

(2) Subsequently, the conductive paste for inner electrodes is printed on the dielectric sheet in a predetermined pattern by, for example, screen printing or gravure printing to form an inner electrode pattern.

(3) Subsequently, a predetermined number of dielectric sheets for outer layers on which the inner electrode pattern is not printed are stacked, dielectric sheets on which the inner electrode pattern is printed are sequentially stacked thereon, and a predetermined number of dielectric sheets for outer layers are stacked thereon. Thus, stacked sheets are produced.

(4) Subsequently, the stacked sheets are pressed in a stacking direction by a method such as an isostatic press to produce a multilayer block.

(5) Subsequently, the multilayer block is cut into a predetermined size to provide multilayer chips. At this time, the multilayer chips may be subjected to, for example, barrel polishing to round the corner portions and ridge portions of the multilayer chips.

(6) Subsequently, the multilayer chips are fired to produce multilayer bodies. The firing temperature varies depending on the materials for the dielectric and the inner electrode layers, and is preferably about 900° C. to about 1300° C., for example.

(7) Subsequently, a resin electrode paste that contains a metal component 34 and a thermosetting resin 32 and that is formed into a resin electrode layer 26 is applied onto both end surfaces of each of the multilayer bodies. Heat treatment is performed at a temperature of about 250° C. to about 550° C. to heat-cure the resin 32, for example. At this time, the heat treatment is preferably performed in a $N_2$ atmosphere. The oxygen concentration is preferably set to about 100 ppm or less, for example, to prevent scattering of the resin and oxidation of the metal components.

The content of the metal component 34 in the resin electrode paste is preferably about 79 wt % or more and about 93 wt % or less relative to the total weight of the metal component 34 and the resin component 32, for example.

To adjust Lf/La, the surface resin ratio of the resin electrode layer 26 during Sn plating needs to be controlled. To achieve this, the composition of the resin electrode paste needs to be adjusted such that the surface resin ratio is slightly higher than the desired surface resin ratio when the resin electrode paste is completely cured. Furthermore, the conditions for removing the surface resin component 32 need to be optimized.

(8) A Sn plating layer is formed as a plating layer 28 on the resin electrode layer 26.

The Sn plating layer can be formed by an electroplating method or an electroless plating method.

Through the above processes, a multilayer ceramic capacitor 10 according to the present preferred embodiment is produced.

The length of an interface between the resin electrode layer 26 and the plating layer 28 is represented by La. At the interface between the resin electrode layer 26 and the plating layer 28, the length of a portion in which the plating layer 28 and the metal component 34 in the resin electrode layer 26 are in contact with each other is represented by Lf.

Lf/La can be calculated by the following method.

The multilayer ceramic capacitor 10 is polished until the section at an approximately ½ position in the width direction W appears to expose an LT surface of the multilayer ceramic capacitor. Then, a number of electron micrographs with which the length La of the interface between the resin electrode layer 26 (indicated as 26b in FIG. 5) and the Sn plating layer 28 (indicated as 28b in FIG. 5) can be measured to be about 100 μm or more are taken using a scanning electron microscope (SEM) with a magnification of 3000 times or more focusing on the center of the end surface of the chip. Then, the total length of a portion in which the plating layer 28 (indicated as 28b in FIG. 5) and the metal component 34 in the resin electrode layer 26 (indicated as 26b in FIG. 5) are in contact with each other is calculated as Lf through image analysis. FIG. 5 is an enlarged view of an A portion in FIG. 2. For example, as illustrated in FIG. 5, the length Lf of a portion in which the plating layer 28 (indicated as 28b in FIG. 5) and the metal component 34 in the resin electrode layer 26 (indicated as 26b in FIG. 5) are in contact with each other is calculated.

Lf/La is able to be adjusted by controlling the amount of the resin component 32 exposed at the surface of the resin electrode layer 26 through contact polishing such as barrel polishing with rounded stones or sandblasting or through removal of organic components with laser or plasma.

Solder bursting can be confirmed by the following method.

After the multilayer ceramic capacitor is mounted on a glass epoxy substrate by reflow soldering, the degree of scattering of solder is checked through visual inspection. Herein, a multilayer ceramic capacitor in which spray-like scattering is observed on the outer electrode 24 is regarded as "No Good".

A fixing force limit test (a test for verifying the effect of Ni plating) can be performed by the following method.

Figure 6:
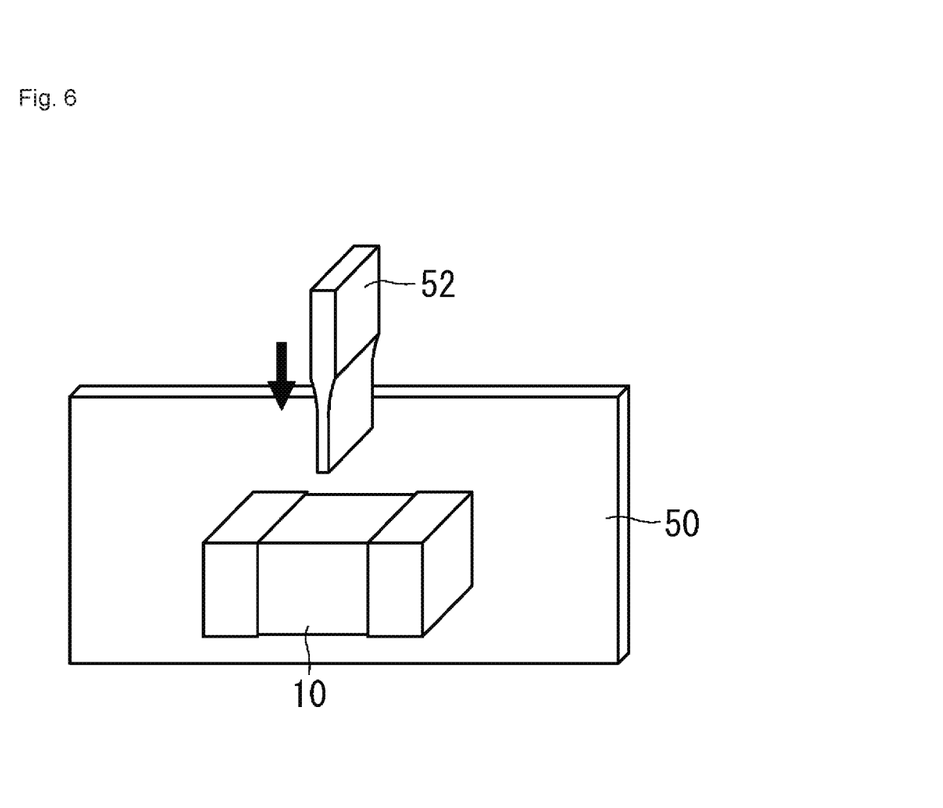
FIG. 6 illustrates a method for performing a fixing force limit test on a multilayer ceramic capacitor according to a preferred embodiment of the present invention.

As illustrated in FIG. 6, the multilayer ceramic capacitor 10 is fixed to a substrate 50 (JIS land design substrate) using a solder SAC305. The solder SAC305 is a mixture of Sn, about 3.0% Ag, and about 0.5% Cu. A load is applied to the central portion of the multilayer ceramic capacitor using a pressurizing jig 52 at a loading rate of about 0.5 mm/s until the outer electrode 24 detaches. The load at which the outer electrode 24 detaches is recorded as a fixing force limit.

In the thus-obtained multilayer ceramic capacitor 10, portions in which the resin component 32 of the resin electrode layer 26 is exposed are present on the surface of the outer electrode 24. By providing such portions in which the resin component 32 of the resin electrode layer 26 is exposed, paths through which water vapor and organic gas generated from the resin electrode layer 26 during reflow flow to the surface are able to be provided. Therefore, the pressure of water vapor and organic gas generated from the resin electrode layer 26 during reflow is able to be released from the inside of the outer electrode 24, which is able to reduce or prevent solder bursting.

When the length of the interface between the resin electrode layer 26 and the plating layer 28 is represented by La and the length of a portion in which the plating layer 28 and the metal component 34 in the resin electrode layer 26 are in contact with each other at the interface between the resin electrode layer 26 and the plating layer 28 is represented by Lf, Lf/La≤about 0.98 is satisfied, for example. In combination with the effect of Sn plating, this provides paths through which water vapor and organic gas generated from the resin electrode layer 26 during reflow flow to the surface. Therefore, the pressure of water vapor and organic gas generated from the resin electrode layer 26 during reflow is able to be released from the inside of the outer electrode 24, which reduces or prevents solder bursting.

When the length of the interface between the resin electrode layer 26 and the plating layer 28 is represented by La and the length of a portion in which the plating layer 28 and the metal component 34 in the resin electrode layer 26 are in contact with each other at the interface between the resin electrode layer 26 and the plating layer 28 is represented by Lf, about 0.92 Lf/La is preferably satisfied, for example. Thus, paths through which water vapor and organic gas generated from the resin electrode layer 26 during reflow flow to the surface are able to be provided without decreasing the fixing force with a mounting substrate, which produces both effects of reducing or preventing solder bursting and ensuring a fixing force.

Next, to confirm the advantageous effects of the multilayer ceramic capacitor 10 according to a preferred embodiment of the present invention, a multilayer ceramic capacitor 10 having the structure in FIG. 1 was produced by the above-described production method, and a solder bursting test and a fixing force limit test were performed.

(1) Production of Sample for Evaluation

A multilayer ceramic capacitor 10 for each of samples in non-limiting Experimental Examples was produced by the above-described production method under the following conditions.

A multilayer ceramic capacitor satisfying the following conditions was provided as a multilayer ceramic capacitor 10 used in each Experimental Example. The surface of the resin electrode layer 26 after curing of the resin electrode paste was polished by performing sandblasting. Herein, the time for which sandblasting was performed was changed to control the amount of the resin exposed at the surface of the resin electrode layer 26.

(a) Size (L×W×T): 1.0 mm×0.5 mm×0.5 mm
(b) Ceramic material: $BaTiO_3$
(c) Electrostatic capacitance: 0.01 μF
(d) Rated power: 50 V
(e) Structure of outer electrode 24: two-layer structure including resin electrode layer 26 and Sn plating layer 28
  (i) Metal for resin electrode layer 26: Ni
  Resin for resin electrode layer 26: epoxy resin
  Curing temperature of resin for resin electrode layer 26: 230° C.
  Volume of metal for resin electrode layer 26: 42 vol %
  Volume of resin for resin electrode layer 26: 58 vol %
  Thickness of resin electrode layer 26 at ½ position in length direction of side surfaces and main surfaces of multilayer body: 22 μm
  Thickness of resin electrode layer 26 at ½ position in height direction of end surfaces of multilayer body: 9 μm
  (ii) Thickness of Sn plating layer 28 at ½ position in length direction of side surfaces and main surfaces of multilayer body: 4 μm
  Thickness of Sn plating layer 28 at ½ position in height direction of end surfaces of multilayer body: 5.5 μm
(f) Structure of inner electrode 16: not divided structure
Metal for inner electrode 16: Ni A multilayer ceramic capacitor satisfying the following conditions was provided as a multilayer ceramic capacitor used in Comparative Example 1.

(a) Size (L×W×T): 1.0 mm×0.5 mm×0.5 mm
(b) Ceramic material: $BaTiO_3$
(c) Electrostatic capacitance: 0.01 μF
(d) Rated power: 50 V
(e) Structure of outer electrode: three-layer structure including resin electrode layer, Ni plating layer, and Sn plating layer
  (i) Metal for resin electrode layer: Ag
  Resin for resin electrode layer: epoxy resin
  Curing temperature of resin for resin electrode layer: 230° C.
  Volume of metal for resin electrode layer: 50 vol %
  Volume of resin for resin electrode layer: 50 vol % Thickness of resin electrode layer at ½ position in length direction of side surfaces and main surfaces of multilayer body: 28 μm
  Thickness of resin electrode layer at ½ position in height direction of end surfaces of multilayer body: 12 μm
  (ii) Thickness of Ni plating layer at ½ position in length direction of side surfaces and main surfaces of multilayer body: 2.8 μm
  Thickness of Ni plating layer at ½ position in height direction of end surfaces of multilayer body: 3.5 μm
  (iii) Thickness of Sn plating layer at ½ position in length direction of side surfaces and main surfaces of multilayer body 12: 4.6 μm Thickness of Sn plating layer at ½ position in height direction of end surfaces of multilayer body 12: 5.7 μm (f) Structure of inner electrode: not divided structure
Metal for inner electrode: Ni For these samples, solder bursting was confirmed and the fixing force limit test was performed by the following procedures.

Solder bursting was confirmed by the following method.

After 100 samples were mounted on a glass epoxy substrate by reflow soldering, the degree of scattering of solder was checked through visual inspection. Herein, samples in which spray-like scattering was observed on the outer electrode 24 were regarded as "No Good". Table 1 shows the number of samples subjected to solder bursting among the 100 samples.

The fixing force limit test was performed by the following method.

The multilayer ceramic capacitor 10 was fixed to a substrate 50 (JIS land design substrate) using a solder SAC305. The solder SAC305 was a mixture of Sn, 3.0% Ag, and 0.5% Cu. A load was applied to the central portion of the multilayer ceramic capacitor using a pressurizing jig 52 at a loading rate of about 0.5 mm/s until the outer electrode 24 detached. The load at which the outer electrode 24 detached was recorded as a fixing force limit.

In the fixing force limit test, the threshold was set to AVE−3σ>5.00 [N].

Table 1 shows the average (AVE), maximum (MAX), minimum (MIN), standard deviation (σ), and lower fixing force limit (AVE−3σ) of 20 samples.

24, paths through which water vapor and organic gas generated from the resin electrode layer 26 during reflow flow to the surface can be provided.

When a Ni plating layer that is a known structure is formed, paths through which water vapor and organic gas generated from the resin electrode layer 26 during reflow flow to the surface are only dot-shaped paths formed by locally destroying the Ni plating layer in a portion between the Ni plating layer and the resin electrode layer 26 (since the Ni plating layer covers the entire surface of the resin electrode layer 26, there are basically no escape routes, but the electrode surface is locally destroyed by water vapor and organic gas generated from the resin electrode layer 26). In various preferred embodiments of the present invention in which Lf/La satisfies Lf/La≤about 0.98, however, by disposing the Sn plating layer on the resin electrode layer 26, the Sn plating layer is melted together with solder during mounting, which induces formation of regions in which the Sn plating layer is not present on the resin component of the resin electrode layer 26. Thus, by forming portions not covered with the Sn plating layer on the surface of the outer electrode 24, paths through which water vapor and organic gas generated from the resin electrode layer 26 during reflow flow to the surface are able to be provided as linear paths that thread through portions between particles of the metal component 34 of the resin electrode layer 26 (the lines that trace portions which appear on the resin component on the electrode surface and in which the Sn plating layer is not present). This ensures paths through which gas is ejected to the surface of the outer electrode 24. Consequently, the

TABLE 1

| | Comparative Example 1 | Example 1 | Example 2 | Example 3 | Example 4 | Example 5 | Example 6 |
|---|---|---|---|---|---|---|---|
| Resin electrode metal component | Ag | Ni | Ni | Ni | Ni | Ni | Ni |
| Ni plating | Yes | No | No | No | No | No | No |
| Sn plating | Yes | Yes | Yes | Yes | Yes | Yes | Yes |
| Lf/La | 1.00 | 1.00 | 0.98 | 0.95 | 0.92 | 0.89 | 0.84 |
| Solder bursting test (n = 100) | | | | | | | |
| Number of samples subjected to solder bursting | 17/100 | 6/100 | 0/100 | 0/100 | 0/100 | 0/100 | 0/100 |
| Result of fixing force limit test [N] (n = 20) | | | | | | | |
| AVE | 12.88 | 10.90 | 11.06 | 9.50 | 9.23 | 6.74 | 6.15 |
| MAX | 15.1 | 13.6 | 12.4 | 10.4 | 11.7 | 11.2 | 9.1 |
| MIN | 8.9 | 8.9 | 8.5 | 8.4 | 7.5 | 3.8 | 2.5 |
| σ | 1.47 | 1.22 | 1.02 | 0.53 | 1.11 | 1.96 | 1.69 |
| AVE−3σ | 8.45 | 7.22 | 7.99 | 7.90 | 5.88 | 0.86 | 1.08 |

When Lf/La was 0.98 or less, solder bursting did not occur.

When Lf/La was 0.92 or more, the fixing force was 5 N or more.

Thus, when Lf/La satisfied 0.92≤Lf/La≤0.98, solder bursting did not occur and the fixing force was maintained.

The above results show the following. In various preferred embodiments of the present invention, by directly disposing the Sn plating layer 28 on the surface of the resin electrode layer 26 mainly containing Ni, the Sn plating layer is melted together with solder during mounting. This induces formation of portions in which the resin component of the resin electrode layer 26 is exposed without providing the Sn plating layer on the resin component of the resin electrode layer 26. Thus, by providing portions that are not covered with the Sn plating layer on the surface of the outer electrode pressure of water vapor and organic gas generated from the resin electrode layer 26 during reflow does not increase compared with the known Ni plating structure in which paths through which gas is ejected to the surface of the outer electrode 24 are localized, and thus solder bursting is reduced or prevented.

On the other hand, when about 0.92>Lf/La is satisfied, the number of interfaces between the resin 32 of the resin electrode layer 26 and solder is large. Consequently, a fixing force normally obtained by forming an alloy between the solder and the outer electrode surface (plating layer) is not obtained at the interfaces, which may cause chip detachment after mounting. Therefore, by satisfying about 0.92≤Lf/La, a strong fixing force is able to be maintained between the mounting substrate 50 and the multilayer ceramic capacitor 10.

Figure 7:
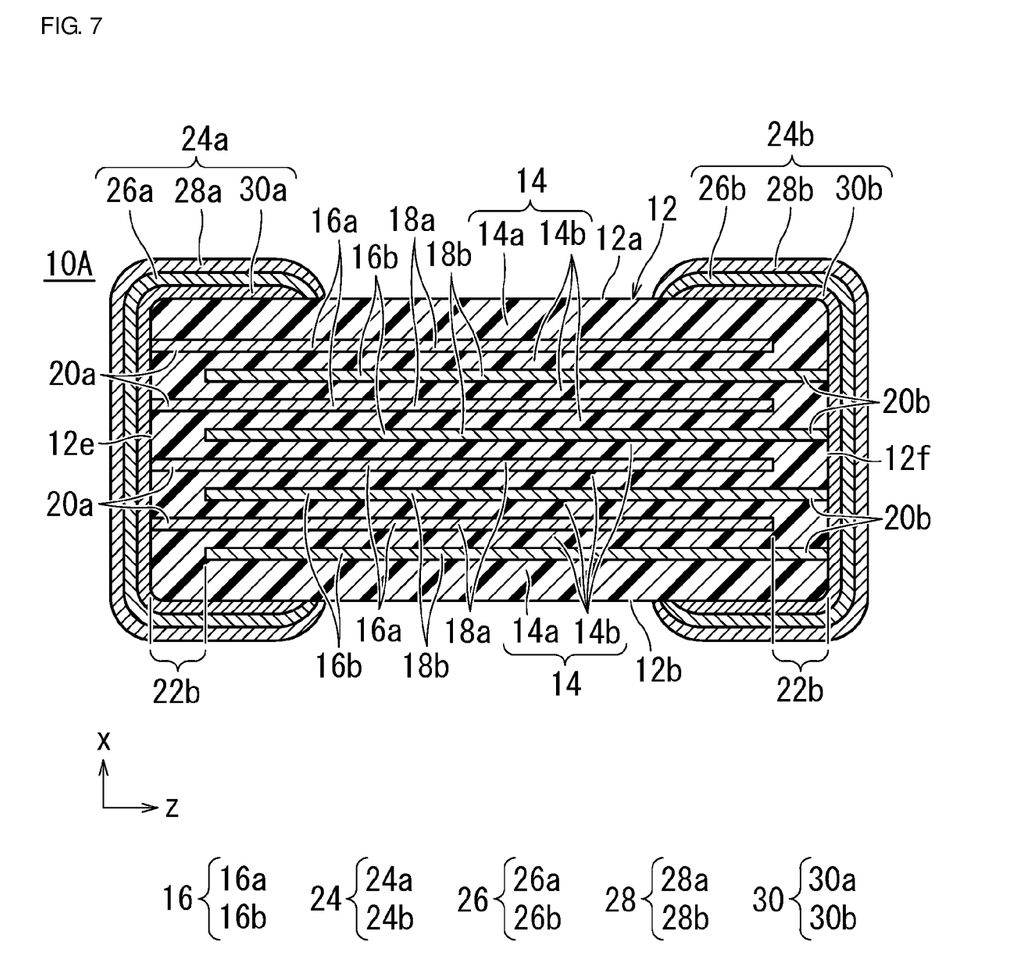
FIG. 7 is an LT sectional view according to a modification of a multilayer ceramic capacitor according to a preferred embodiment of the present invention.

In a modification of a preferred embodiment of the present invention, as illustrated in FIG. 7, the outer electrode 24 may further include an underlying electrode layer 30 containing a conductive metal and a glass component. Thus, the inner electrodes 16 and the outer electrodes 24 are able to be more firmly brought into contact with each other, which provides a multilayer ceramic capacitor having high reliability of moisture resistance.

The underlying electrode layer 30 of the outer electrode 24 used in a multilayer ceramic capacitor 10A will be described. The same portions as those of the multilayer ceramic capacitor 10 according to a preferred embodiment of the present invention are designated by the same reference numerals, and the repetitive description is omitted.

The underlying electrode layer 30 includes a first underlying electrode layer 30a and a second underlying electrode layer 30b.

The first underlying electrode layer 30a is disposed so as to cover the first end surface 12e of the multilayer body 12 and to be connected to the first inner electrode layer 16a. Specifically, the first underlying electrode layer 30a is preferably disposed so as to cover portions of the first main surface 12a, the second main surface 12b, the first side surface 12c, and the second side surface 12d. The first underlying electrode layer 30a may be disposed only on the first end surface 12e. The above-described first resin electrode layer 26a is disposed on the first underlying electrode layer 30a.

The second underlying electrode layer 30b is disposed so as to cover the second end surface 12f of the multilayer body 12 and to be connected to the second inner electrode layer 16b. Specifically, the second underlying electrode layer 30b is preferably disposed so as to cover portions of the first main surface 12a, the second main surface 12b, the first side surface 12c, and the second side surface 12d. The second underlying electrode layer 30b may be disposed only on the second end surface 12f. The second resin electrode layer 26b is disposed on the second underlying electrode layer 30b.

The first underlying electrode layer 30a and the second underlying electrode layer 30b contain a conductive metal and a glass component.

The metal for the first underlying electrode layer 30a and the second underlying electrode layer 30b contains at least one selected from, for example, Cu, Ni, Ag, Pd, an Ag—Pd alloy, and Au.

The glass for the first underlying electrode layer 30a and the second underlying electrode layer 30b contains at least one selected from, for example, B, Si, Ba, Mg, Al, and Li.

The first underlying electrode layer 30a and the second underlying electrode layer 30b may have a multilayer structure.

The first underlying electrode layer 30a and the second underlying electrode layer 30b preferably are formed by applying a conductive paste containing glass and metal onto the multilayer body and performing firing. The first underlying electrode layer 30a and the second underlying electrode layer 30b may be fired simultaneously with the inner electrodes 16 or may be fired after the inner electrodes 16 are fired.

The thickness of the central portions of the first underlying electrode layer 30a and the second underlying electrode layer 30b on the first main surface 12a, second main surface 12b, first side surface 12c, and second side surface 12d of the multilayer body 12 in the length direction of the first underlying electrode layer 30a and the second underlying electrode layer 30b is preferably, for example, about 15 μm or more and about 160 μm or less.

The thickness of the central portions of the first underlying electrode layer 30a and the second underlying electrode layer 30b on the first end surface 12e and the second end surface 12f in the height direction of the first underlying electrode layer 30a and the second underlying electrode layer 30b is preferably, for example, about 5 μm or more and about 40 μm or less.

The tip end of the resin electrode layer 26 preferably extends from the tip end of the underlying electrode layer 30 by about 50 μm or more and about 800 μm or less, for example. Thus, the area of the resin electrode layer 26 is able to be sufficiently increased to reduce the stress during thermal shock cycles, which reduces or prevents solder cracking.

The present invention is not limited to the above-described preferred embodiments and various changes can be made without departing from the spirit of the present invention. The above-described preferred embodiments are only examples. The structures described in the different preferred embodiments can partially be replaced or combined with each other.

While preferred embodiments of the present invention have been described above, it is to be understood that variations and modifications will be apparent to those skilled in the art without departing from the scope and spirit of the present invention. The scope of the invention, therefore, is to be determined solely by the following claims.

What is claimed is:

1. A multilayer ceramic capacitor comprising:
a multilayer body that includes a plurality of dielectric layers laminated and a plurality of inner electrodes laminated and that includes a first main surface and a second main surface that are opposite each other in a lamination direction, a first side surface and a second side surface that are opposite each other in a width direction perpendicular or substantially perpendicular to the lamination direction, and a first end surface and a second end surface that are opposite each other in a length direction perpendicular or substantially perpendicular to the lamination direction and the width direction; and
outer electrodes that are connected to the inner electrodes and disposed on the first and second end surfaces; wherein
each of the outer electrodes includes:
a resin electrode layer including a thermosetting resin and a metal component; and
a plating layer in direct contact with the resin electrode layer;
the metal component in the resin electrode layer includes Ni;
the plating layer is a Sn plating layer; and
about $0.92 \leq Lf/La \leq$ about $0.98$ is satisfied, where La represents a length of an interface between the resin electrode layer and the plating layer and Lf represents a length of a portion in which the plating layer and the metal component in the resin electrode layer are in contact with each other at the interface between the resin electrode layer and the plating layer.

2. The multilayer ceramic capacitor according to claim 1, wherein a surface of each of the outer electrodes includes a portion in which a resin component of the resin electrode layer is exposed.

3. The multilayer ceramic capacitor according to claim 1, wherein each of the outer electrodes includes an underlying electrode layer including a conductive metal and a glass component;

the underlying electrode layer covers an end surface of the multilayer body; and the resin electrode layer is disposed on the underlying electrode layer.

4. The multilayer ceramic capacitor according to claim 1, wherein Ni defining the metal component is elemental Ni or an alloy containing Ni.

5. The multilayer ceramic capacitor according to claim 1, wherein the multilayer body is a rectangular or substantially rectangular parallelepiped multilayer body.

6. The multilayer ceramic capacitor according to claim 1, wherein the multilayer body includes rounded corner portions or rounded ridge portions.

7. The multilayer ceramic capacitor according to claim 1, wherein external dimensions of the multilayer body include a length of about 0.370 mm or more and about 5.500 mm or less, a width of about 0.195 mm or more and about 4.920 mm or less, and a thickness of about 0.195 mm or more and about 2.960 mm or less.

8. The multilayer ceramic capacitor according to claim 1, wherein the plurality of inner electrodes includes floating inner electrodes.

9. The multilayer ceramic capacitor according to claim 1, wherein the multilayer body includes a plurality of capacitor components connected in series.

10. The multilayer ceramic capacitor according to claim 1, wherein the resin electrode layer includes a first resin electrode layer and a second resin electrode layer.

11. The multilayer ceramic capacitor according to claim 1, wherein the thermosetting resin is one of epoxy resin, a phenolic resin, a urethane resin, a silicone resin, and a polyimide resin.

12. The multilayer ceramic capacitor according to claim 1, wherein the resin electrode layer includes a curing agent.

13. The multilayer ceramic capacitor according to claim 1, wherein a content of the metal component in the resin electrode layer is about 35 vol % or more and about 92 vol % or less.

14. The multilayer ceramic capacitor according to claim 1, wherein the metal component in the resin electrode layer has one of a spherical shape, a flat shape and a needle shape.

15. The multilayer ceramic capacitor according to claim 1, wherein the metal component in the resin electrode layer is a mixture of a spherical metal powder and a flat metal powder.

16. The multilayer ceramic capacitor according to claim 1, wherein an average particle size of the metal component in the resin electrode layer is about 0.3 μm or more and about 10 μm or less.

17. The multilayer ceramic capacitor according to claim 1, wherein the plating layer includes a first plating layer and a second plating layer.

* * * * *